United States Patent
Liu et al.

(10) Patent No.: US 11,265,871 B2
(45) Date of Patent: Mar. 1, 2022

(54) RELAY TRANSMISSION METHOD AND APPARATUS

(71) Applicant: HUAWEI TECHNOLOGIES CO., LTD., Shenzhen (CN)

(72) Inventors: Fengwei Liu, Chengdu (CN); Xiaoyong Tang, Shenzhen (CN); Lei Chen, Shenzhen (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/992,134

(22) Filed: Aug. 13, 2020

(65) Prior Publication Data
US 2020/0374871 A1 Nov. 26, 2020

Related U.S. Application Data

(63) Continuation of application No. PCT/CN2019/074337, filed on Feb. 1, 2019.

(30) Foreign Application Priority Data

Feb. 14, 2018 (CN) .......................... 201810151442.4

(51) Int. Cl.
*H04W 72/04* (2009.01)
*H04W 56/00* (2009.01)
(Continued)

(52) U.S. Cl.
CPC ..... *H04W 72/0426* (2013.01); *H04W 56/001* (2013.01); *H04W 72/046* (2013.01);
(Continued)

(58) Field of Classification Search
CPC .... H04B 7/0619; H04B 7/0695; H04B 7/088; H04B 7/15507; H04B 7/2125;
(Continued)

(56) References Cited

U.S. PATENT DOCUMENTS

| 8,699,451 B2 | 4/2014 | Cai et al. |
| 2016/0191259 A1 | 6/2016 | Ben-Yehezkel et al. |

(Continued)

FOREIGN PATENT DOCUMENTS

| CN | 101742610 A | 6/2010 |
| CN | 104396338 A | 3/2015 |

(Continued)

OTHER PUBLICATIONS

Ericsson, "Deployment scenarios and use cases for Integrated Access Backhaul", 3GPP TSG-RAN WG2 NR AH1801, R2-1801021, Vancouver, CA, Jan. 22, 2018, total 6 pages.

Zte et al., "Remaining details on beam management", 3GPP TSG RAN WG1 Meeting AH 1801, R1-1800110, Vancouver, Canada, Jan. 22, 2018, total 7 pages.

*Primary Examiner* — Kevin C. Harper
*Assistant Examiner* — Derrick V Rose
(74) *Attorney, Agent, or Firm* — Rimon PC

(57) ABSTRACT

Various embodiments provide a relay transmission method, where a first node is a parent node of a second node. In those embodiments, a request message from the first node can be received by the second node, where the request message is configured to request the second node to become a parent node of the first node. Still in those embodiments, indication information can be sent, by the second node, to the first node, where the indication information is used to indicate that a downlink beam sent from the second node to the first node after the second node becomes the parent node is the same as or similar to an uplink beam sent from the second node to the first node when the first node is the parent node. The indication information may be carried in a response message for the request message.

18 Claims, 6 Drawing Sheets

(51) Int. Cl.
*H04W 84/04* (2009.01)
*H04W 84/20* (2009.01)
*H04W 88/08* (2009.01)

(52) U.S. Cl.
CPC .......... *H04W 84/047* (2013.01); *H04W 84/20* (2013.01); *H04W 88/08* (2013.01)

(58) Field of Classification Search
CPC ..... H04L 5/0023; H04L 5/0035; H04L 5/005; H04L 5/0051; H04L 5/0091; H04L 5/0048; H04L 5/0094; H04W 56/001; H04W 56/0015; H04W 56/0045; H04W 72/0426; H04W 72/046; H04W 84/047; H04W 56/0055; H04W 72/042; H04W 84/20; H04W 88/08
See application file for complete search history.

(56) References Cited

U.S. PATENT DOCUMENTS

2016/0337875 A1   11/2016  Sheng
2017/0272928 A1*  9/2017  Jeng ...................... H04W 8/005
2019/0109745 A1*  4/2019  Abedini ................ H04L 5/0048

FOREIGN PATENT DOCUMENTS

| | | |
|---|---|---|
| CN | 104620636 A | 5/2015 |
| CN | 107113688 A | 8/2017 |
| JP | 2013070176 A | 4/2013 |
| JP | 2017152855 A | 8/2017 |
| KR | 101043763 B1 | 6/2011 |
| WO | 2017034182 A1 | 3/2017 |

\* cited by examiner

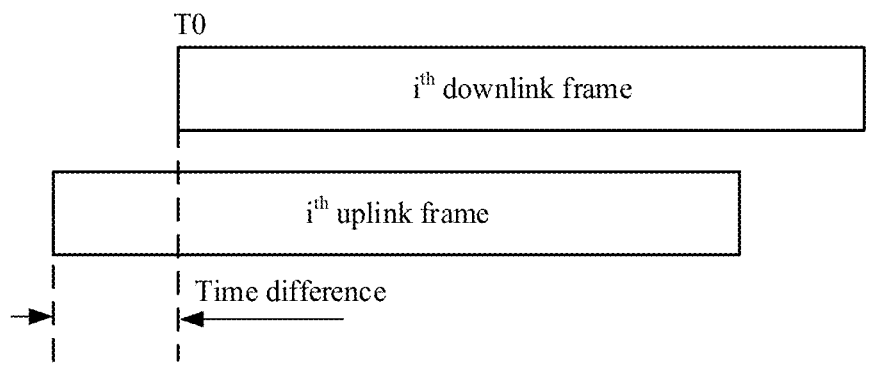

FIG. 6b

```
┌─────────────────────────────────────────────────────┐
│ A second node notifies a first node of a first time │
│ difference, where the first time difference is a    │ ~ 701
│ time difference between a start moment of a frame   │
│ in which the second node performs downlink sending  │
│ and a start moment of a frame in which the second   │
│ node performs uplink sending when the first node is │
│ a parent node                                       │
└─────────────────────────────────────────────────────┘
                          │
┌─────────────────────────────────────────────────────┐
│ The first node determines, based on the first time  │ ~ 702
│ difference, a timing for downlink receiving         │
└─────────────────────────────────────────────────────┘
```

FIG. 7

RELAY TRANSMISSION METHOD AND APPARATUS

CROSS-REFERENCE TO RELATED APPLICATIONS

This application is a continuation of International Application No. PCT/CN2019/074337, filed on Feb. 1, 2019, which claims priority to Chinese Patent Application No. 201810151442.4, filed on Feb. 14, 2018, which are hereby incorporated by reference in their entireties.

TECHNICAL FIELD

The present disclosure relates to the field of communications technologies, and in particular, to a relay transmission method and apparatus.

BACKGROUND

In a next generation communications system, relay transmission is introduced to improve coverage of a base station. Through the relay transmission, a non-line of sight (NLOS) channel is converted into a line of sight (LOS) channel, and system stability and a throughput are improved. In a relay transmission process, there are three types of network nodes: a base station, a relay node, and a terminal. The relay node is newly introduced to a network, and therefore some new connection links need to be added. In a cell including the relay node, connection links may be classified, based on different service objects of the links, into the following three types: an access link (access link), a direct link, and a backhaul link (backhaul link). The direct link is used for communication between the base station and a terminal served by the base station. The access link is used for communication between the relay node and a terminal served by the relay node. The backhaul link is used for communication between the relay node and the base station. That the relay node receives data from the base station may be considered as downlink backhaul transmission. That the relay node sends data to the base station may be considered as uplink backhaul transmission. The uplink backhaul transmission and the downlink backhaul transmission may be collectively referred to as backhaul transmission. That the relay node or the base station sends data to the terminal may be considered as downlink access transmission. That the relay node or the base station receives data from the terminal may be considered as uplink access transmission. The uplink access transmission and the downlink access transmission may be collectively referred to as access transmission.

FIG. 1 is a schematic architectural diagram of a multi-hop relay network system. As shown in FIG. 1, the system includes a base station, a relay node, and a terminal. The terminal may be connected to the base station in a wireless manner, and perform data transmission with the base station. The terminal may also be connected to the relay node in the wireless manner, and perform data transmission with the relay node. In FIG. 1, there is a backhaul link between a base station 1 and a relay node 2, a backhaul link between the relay node 2 and a relay node 1, an access link between the relay node 1 and a terminal 1, and a direct link between the base station 1 and a terminal 2. Further, the relay node 1 in FIG. 1 may also be connected to a base station 2. To be specific, when the relay node 2 cannot communicate with the base station 1, the relay node 1 may establish a backhaul link with the base station 2, so as to be served by the base station 2. However, as an original parent node of the relay node 1, the relay node 2 cannot directly communicate with the base station 2 via the relay node 1. Consequently, this may cause a communication interruption to another child node (for example, another relay node or terminal) served by the relay node 2.

SUMMARY

Various embodiments provide a relay transmission method and apparatus, to switch a parent-child relationship between relay nodes, and further to avoid or reduce communication interruptions.

According to a first aspect, one embodiment in accordance with the present disclosure provides a relay transmission method, where a first node is a parent node of a second node, and the method includes: receiving, by the second node, a request message from the first node, where the request message is used to request the second node to become a parent node of the first node; and sending, by the second node, indication information to the first node, where the indication information is used to indicate that a downlink beam sent from the second node to the first node after the second node becomes the parent node is the same as or similar to an uplink beam sent from the second node to the first node when the first node is the parent node. The indication information may be carried in a response message for the request message.

The first node may learn of, through the indication information, information about a transmit beam used by the second node after switching. Therefore, an additional beam search or beam training is not required in a switching process.

In one example implementation, the indication information includes an identifier of a first reference signal and an identifier of a second reference signal; the downlink beam is indicated by the identifier of the first reference signal, and the uplink beam is indicated by the identifier of the second reference signal; and that the downlink beam is the same as or similar to the uplink beam is represented by a quasi co-location (QCL) relationship between the first reference signal and the second reference signal.

The QCL relationship between the two reference signals is used to represent that the two beams are the same or similar. In this case, beam-related information can be carried and signaling overheads can be reduced.

In one example implementation, the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node.

In one example implementation, the indication information further carries at least one of a system information block (SIB), a master information block (MIB), or available resource information of the second node.

In one example implementation, the method further includes: notifying, by the second node, the first node of a first time difference, where the first time difference is a time difference between a start moment of a frame in which the second node performs downlink sending and a start moment of a frame in which the second node performs uplink sending when the first node is the parent node; and/or notifying, by the second node, the first node of a second time difference, where the second time difference is a time difference between a start moment of a frame in which the first node performs uplink sending after the second node becomes the parent node and a start moment of a frame in which the first node performs downlink sending.

The first time difference and/or the second time difference are/is sent, so as to rapidly implement a timing between the first node and the second node and to ensure communication quality.

According to a second aspect, one embodiment in accordance with the present disclosure provides a relay transmission method, and the method includes: receiving, by a second node, a request message from a first node, where the request message is used to request the first node to become a parent node of the second node, the first node is a child node of the second node, and the request message further includes a correspondence between a signal in a first signal set and a signal in a second signal set. The signal in the second signal set is used to indicate a transmit beam used by the second node when the first node is the parent node of the second node, and the signal in the first signal set is used to indicate a transmit beam used by the second node when the first node is the child node of the second node.

The first signal set may be a set of first reference signals in the first aspect, and the second signal set may be a set of second reference signals in the first aspect. The correspondence may be a QCL relationship.

According to a third aspect, one embodiment in accordance with the present disclosure provides a relay transmission method, where a first node is a parent node of a second node, and the method includes: sending, by the first node, a request message to the second node, where the request message is used to request the second node to become a parent node of the first node; and receiving, by the first node, indication information from the second node, where the indication information is used to indicate that a downlink beam sent from the second node to the first node after the second node becomes the parent node is the same as or similar to an uplink beam sent from the second node to the first node when the first node is the parent node. The indication information may be carried in a response message for the request message.

The first node may learn of, through the indication information, information about a transmit beam used by the second node after switching. Therefore, an additional beam search or beam training is not required in a switching process.

In one example implementation, the indication information includes an identifier of a first reference signal and an identifier of a second reference signal; the downlink beam is indicated by the identifier of the first reference signal, and the uplink beam is indicated by the identifier of the second reference signal; and that the downlink beam is the same as or similar to the uplink beam is represented by a quasi co-location (QCL) relationship between the first reference signal and the second reference signal.

The QCL relationship between the two reference signals is used to represent that the two beams are the same or similar. In this case, the reference signals can be sent and beam-related information can be carried. Therefore, signaling overheads are reduced.

In one example implementation, the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node.

In one example implementation, the indication information further carries at least one of a system information block (SIB), a master information block (MIB), or available resource information of the second node.

In one example implementation, the method further includes: receiving, by the first node, a first time difference notified by the second node, where the first time difference is a time difference between a start moment of a frame in which the second node performs downlink sending and a start moment of a frame in which the second node performs uplink sending when the first node is the parent node; and/or receiving, by the first node, a first time difference notified by the second node, where the second time difference is a time difference between a start moment of a frame in which the first node performs uplink sending after the second node becomes the parent node and a start moment of a frame in which the first node performs downlink sending.

The first time difference and/or the second time difference are/is sent, so as to rapidly implement a timing between the first node and the second node and to ensure communication quality.

According to a fourth aspect, one embodiment in accordance with the present disclosure provides a relay transmission method, and the method includes: receiving, by a first node, a response message from a second node. The response message carries information required for the first node to access the second node, and the information includes available resource information of the first node. The response message further includes a correspondence between a signal in a first signal set and a signal in a second signal set, the signal in the first signal set is used to indicate a transmit beam sent from the second node to the first node when the first node is a parent node of the second node, and the signal in the second signal set is used to indicate a transmit beam sent from the second node to the first node when the first node is a child node of the second node.

The first signal set may be a set of first reference signals in the third aspect, and the second signal set may be a set of second reference signals in the third aspect. The correspondence may be a QCL relationship.

In one example implementation, the method further includes: sending, by the first node, first information to the second node, where the first information includes processing capability information of the first node/the available resource information of the first node; receiving, by the first node, a configuration message from the second node, where the configuration message carries information about a downlink receiving resource of the first node/an uplink sending resource of the first node; and performing, by the first node, downlink receiving/uplink sending based on the response message and the configuration message. Specifically, the configuration message carries one or more signals in the second signal set. The one or more signals in the second signal set are used to indicate one or more downlink receiving resources/uplink sending resources.

In one example implementation, the method further includes: determining, by the first node based on the correspondence and the one or more signals in the second signal set that are carried in the configuration message, one or more signals in the first signal set that correspond to the one or more signals in the second signal set that are carried in the configuration message.

In one example implementation, the method further includes: determining, by the first node, one or more downlink receive beams/uplink transmit beams based on the corresponding one or more signals in the first signal set.

According to a fifth aspect, one embodiment in accordance with the present disclosure provides a time synchronization method, and the method includes: receiving, by a second node, a request message from a first node, where the request message is used to request the first node to become a parent node of the second node, and the first node is a child node of the second node; and sending, by the second node, a response message to the first node, where the response message includes a first time difference and/or a second time difference, the first time difference includes a time difference between a moment at which the second node performs downlink sending and a moment at which the second node performs uplink sending when the first node is the parent node of the second node; and/or the second time difference includes a time difference between a moment at which the first node performs uplink sending when the first node is the child node the second node and a moment at which the first node performs downlink sending.

The response message carries information required for the first node to access the second node, and the information includes SIB information, MIB information, or available resource information of the second node.

According to a sixth aspect, one embodiment in accordance with the present disclosure provides a time synchronization method, and the method includes: receiving, by a first node, a response message from a second node, where the response message carries information required for the first node to access the second node, and the information includes available resource information of the first node; and the response message includes a first time difference and/or a second time difference, the first time difference includes a time difference between a moment at which the second node performs downlink sending when the first node is a child node of the second node and a moment at which the second node performs uplink sending when the first node is a parent node of the second node; and/or the second time difference includes a time difference between a moment at which the first node performs uplink sending when the first node is a child node of the second node and a moment at which the first node performs downlink sending when the first node is a parent node of the second node.

In one example implementation, the method further includes: receiving, by the first node, a downlink signal of the second node based on the first time difference; and/or sending, by the first node, an uplink signal to the second node based on the second time difference.

In one example implementation, the method further includes: processing, by the first node, the second time difference to obtain an equivalent timing advance TA; sending, by the first node, the equivalent timing advance to the second node; and performing, by the second node, uplink timing adjustment based on the equivalent timing advance.

In the foregoing aspects, optionally, the response message may indicate that access of the first node is not accepted or that parent-child relationship is not switched.

According to a seventh aspect, one embodiment in accordance with the present disclosure provides a relay transmission apparatus, where a first node is a parent node of a second node, and the apparatus includes: a receiving module, configured to receive a request message from the first node, where the request message is used to request the second node to become a parent node of the first node; and a sending module, configured to send indication information to the first node, where the indication information is used to indicate that a downlink beam sent from the second node to the first node after the second node becomes the parent node is the same as or similar to an uplink beam sent from the second node to the first node when the first node is the parent node.

In one example implementation, the indication information includes an identifier of a first reference signal and an identifier of a second reference signal; the downlink beam is indicated by the identifier of the first reference signal, and the uplink beam is indicated by the identifier of the second reference signal; and that the downlink beam is the same as or similar to the uplink beam is represented by a quasi co-location (QCL) relationship between the first reference signal and the second reference signal.

In one example implementation, the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node.

In one example implementation, the indication information further carries at least one of a system information block (SIB), a master information block (MIB), or available resource information of the second node.

In one example implementation, the sending module is further configured to notify the first node of a first time difference, where the first time difference is a time difference between a start moment of a frame in which the second node performs downlink sending and a start moment of a frame in which the second node performs uplink sending when the first node is the parent node.

In one example implementation, the sending module is further configured to notify the first node of a second time difference, where the second time difference is a time difference between a start moment of a frame in which the first node performs uplink sending after the second node becomes the parent node and a start moment of a frame in which the first node performs downlink sending.

According to an eighth aspect, one embodiment in accordance with the present disclosure provides a relay transmission apparatus, where the apparatus includes a receiving module and a sending module. The receiving module is configured to perform a receiving step in any one of the second aspect to the sixth aspect. The sending module is configured to perform a sending step in any one of the second aspect to the sixth aspect.

According to a ninth aspect, one embodiment in accordance with the present disclosure provides a device, where the device includes a memory, a transceiver, and a processor. The memory is configured to be coupled to the processor. The transceiver is configured to receive and/or send a message. The processor is configured to run code in the memory, so that the device performs the method in any one of the first aspect to the sixth aspect.

According to a tenth aspect, one embodiment in accordance with the present disclosure provides a readable storage medium. The readable storage medium stores an instruction, and when the instruction stored in the readable storage medium is run on a device, the device is enabled to perform the method in any one of the first aspect to the sixth aspect.

According to an eleventh aspect, one embodiment in accordance with the present disclosure provides a computer program product, and when the computer program product runs on a computer, the computer is enabled to perform the method in any one of the first aspect to the sixth aspect.

According to a twelfth aspect, one embodiment in accordance with the present disclosure provides a chip, where the chip includes a communications interface and a processor. The communications interface is configured to receive and/or send a message. The processor is configured to run code in a memory, so that the chip performs the method in any one of the first aspect to the sixth aspect.

According to a thirteenth aspect, one embodiment in accordance with the present disclosure provides a system. The system includes a first node and/or a second node in any one of the first aspect to the sixth aspect.

By using the methods provided in the various embodiments, a parent-child relationship between relay nodes can be switched, to avoid or reduce communication interruptions.

BRIEF DESCRIPTION OF DRAWINGS

FIG. 6b is a schematic diagram of a time difference between a downlink frame and an uplink frame;

FIG. 7 is a schematic diagram of a time synchronization method according to one embodiment in accordance with the present disclosure;

DESCRIPTION OF EMBODIMENTS

A high frequency band deployment scenario is a main deployment scenario in a next generation communications system. An electromagnetic wave at the high frequency band has defects such as poor diffraction capability and severe propagation attenuation. Consequently, it is highly probable that a coverage hole exists in a network. Due to a factor such as deployment costs, an operator can hardly remove the coverage hole by relying only on a limited quantity of TRPs. Necessarily, a relay TRP (rTRP) featuring a wireless backhaul link is introduced.

In LTE, only two-hop transmission can be implemented in a relay network, and therefore a relay node cannot serve another relay node. However, in the next generation communications system, multi-hop multi-connectivity is a design objective that needs to be considered. In a multi-hop multi-connectivity relay network, a relay node may serve another relay node. The relay node that provides a service is referred to as a parent node (or a father node or a master node), and the another relay node that is served is referred to as a child node (or a slave node).

Figure 1:
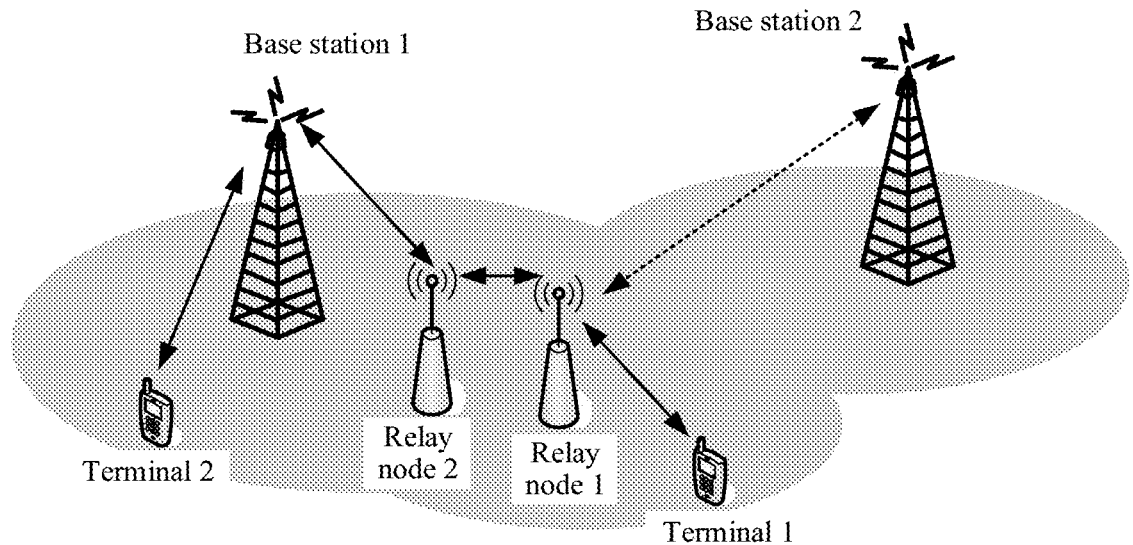
FIG. 1 is a schematic architectural diagram of a multi-hop relay network system.
Figure 2A:
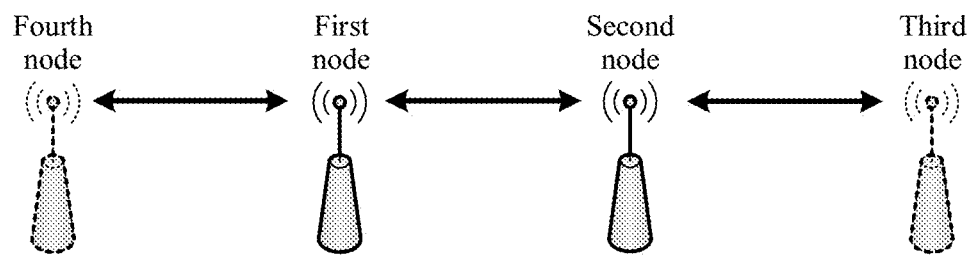
FIG. 2a is a schematic diagram of a structure of a multi-hop multi-connectivity network.

FIG. 2a is a schematic diagram of a structure of a multi-hop multi-connectivity network. Each node is a parent node of an adjacent node that is at the right side of the node. To be specific, a fourth node is a parent node of a first node, the first node is a parent node of a second node, and the second node is a parent node of a third node. Conversely, the third node is a child node of the second node, the second node is a child node of the first node, and the first node is a child node of the fourth node. Certainly, each parent node may have a plurality of child nodes, and each child node may have a plurality of parent nodes. In this case, the solution provided in this application is still applicable. It should be noted that the structure shown in FIG. 2a is merely for ease of subsequent description, and the structure shown in FIG. 2a is not limited in this application. For example, the third node may have a plurality of child nodes, or the second node may have a plurality of parent nodes.

In accordance with the present disclosure, a parent node may be a base station or a relay node, and a child node may be a relay node or a terminal. The base station is an access device through which the terminal accesses a wireless communications system in a wireless manner. The base station may be an evolved NodeB, a base station in a next generation communications system, an access node in a Wi-Fi system, or the like. The relay node may be a node having a relay function. Specifically, the relay node may be a base station, a micro base station, a transmission reception point (TRP), customer premise equipment (CPE), or user equipment. The relay node may operate at a low frequency band or operate at a high frequency band. The terminal device may also be referred to as a terminal device, user equipment (UE), a mobile station (MS), a mobile terminal (MT), or the like. The terminal may be a mobile phone (mobile phone), a tablet (Pad), a computer having a wireless transceiving function, another terminal having a wireless transceiving function, or the like.

A slot in the various embodiments includes a time resource segment, or may be a slot (slot), a transmission time interval (TTI), a time unit, a subframe, or a mini slot.

Figure 2B:
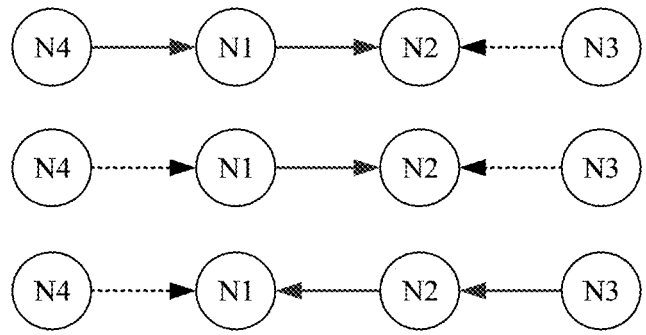
FIG. 2b is a schematic diagram of an application scenario in which a parent-child relationship between relay nodes is switched.

A parent-child relationship between the nodes shown in FIG. 2a is not fixed. In some scenarios, an original child node may need to be changed to a parent node, and an original parent node may need to be changed to a child node. A parent-child relationship between nodes may also be referred to as a master-slave relationship. Therefore, a scenario in which the parent-child relationship between nodes changes is referred to as switching of a parent-child relationship or switching of a master-slave relationship. FIG. 2b is a schematic diagram of an application scenario in which a parent-child relationship between relay nodes is switched. As shown in FIG. 2b, N 4 represents a fourth node, N 1 represents a first node, N 2 represents a second node, and N 3 represents a third node. In a communication process, the fourth node serves the first node, and the first node serves the second node. When communication between the fourth node and the first node is interrupted, the second node may access the third node, and the third node serves the second node. In this case, the second node may serve the first node. Therefore, a parent-child relationship needs to be switched (which may be briefly referred to as switching in this application) between the first node and the second node.

The first node is a parent node of the second node before switching. The second node is a parent node of the first node after switching. It should be noted that in one example implementation, only one of two types of parent-child relationships may exist. To be specific, the first node is the parent node of the second node before switching, while the second node is the parent node of the first node after switching. In another possible implementation, two types of parent-child relationships may both exist. To be specific, before switching, the first node is the parent node of the second node; while after switching, the second node is the parent node of the first node and the first node is still the parent node of the second node. In this application, the parent-child relationship may be a parent-child relationship between nodes in a master cell group or a parent-child relationship between nodes in a secondary cell group in dual connectivity (DC).

In another example implementation, the parent-child relationship in the various embodiments includes a parent-child relationship between the first node and the second node during physical layer transmission. The parent-child relationship in the various embodiments may further include a parent-child relationship between the first node and the second node during higher layer (which is a layer above the physical layer) transmission. Specifically, when the first node is the parent node of the second node, the parent-child relationship between the first node and the second node during physical layer transmission indicates: The first node sends a signal to the second node in a downlink timing manner and a downlink beam indication manner, and/or the first node receives a signal from the second node in an uplink timing manner and an uplink beam indication manner. Similarly, when the second node is the parent node of the first node, the parent-child relationship between the first node and the second node during physical layer transmission indicates: The second node sends a signal to the first node in a downlink timing manner and a downlink beam indication manner, and/or the second node receives a signal from the first node in an uplink timing manner and an uplink beam indication manner. In this case, the method provided in the various embodiments is still applicable.

Embodiment 1

This embodiment provides a method for switching a parent-child relationship between nodes. The method for switching the parent-child relationship may be initiated by an original parent node (for example, a first node) or an original child node (for example, a second node). Before switching of the parent-child relationship, the first node and the second node determine, through signaling exchange, that a parent-child relationship switching procedure is established. During specific implementation, another step may be performed before the following procedure starts. However, this is not a focus in this application, and no limitation is imposed herein.

Figure 3:
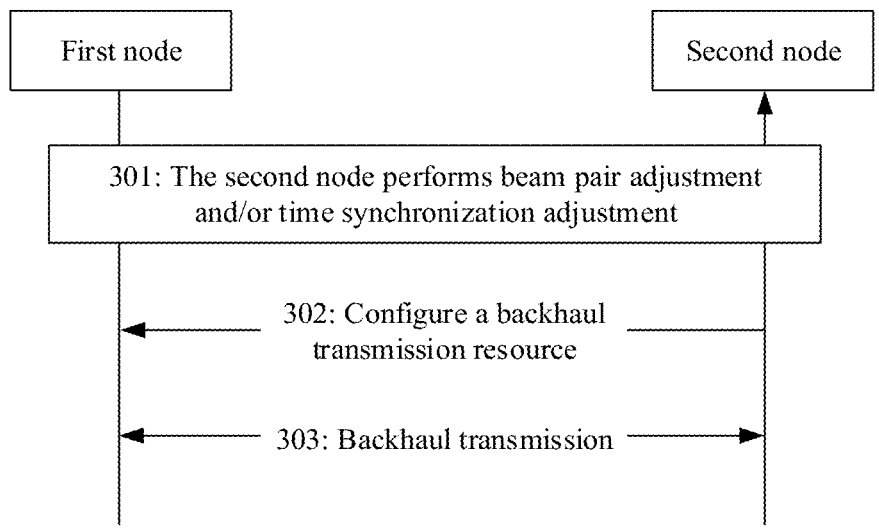
FIG. 3 is a schematic diagram of a method for switching a parent-child relationship according to one embodiment in accordance with the present disclosure.

FIG. 3 is a schematic diagram of a method for switching a parent-child relationship according to one embodiment in accordance with the present disclosure. As shown in FIG. 3, the method includes the following steps.

Step 301: A second node performs beam pair adjustment and/or time synchronization adjustment. The beam pair adjustment and/or time synchronization adjustment may be performed at a physical layer.

Step 302: The second node configures a backhaul transmission resource for a first node.

Step 303: The second node performs backhaul transmission with the first node.

Both the first node and the second node are relay nodes. Having attributes of a base station and a terminal, the relay node can be used as a parent node and can also be used as a child node. Therefore, the relay node has two parameter (or information) sets: A first set is a parameter set of the relay node serving as the parent node. The parameter set includes parameters required for another node to access the relay node. For example, in a regular access process, the base station sends these parameters to the terminal through a broadcast signal or unicast RRC signaling, where the parameters include a synchronization signal configuration, a RACH resource configuration, and the like. A second set is a parameter set of the relay node serving as the child node. The parameter set includes parameters required for the relay node to access another node. In a normal access process, the terminal reports these parameters on a PUSCH, where the parameters include a terminal type, a terminal capability, and the like. Before switching, the child node has base station information of the parent node, and the parent node has terminal information of the child node. After switching, the child node has terminal information of the parent node, and the parent node has base station information of the child node. However, terminal information and base station information of a relay node are not identical, and information needs to be exchanged between two relay nodes. Therefore, the method shown in FIG. 3 further includes the following steps.

Step 304: The first node sends, to the second node, information required for the first node to access the second node. The information includes the second parameter set of the first node. The information may be sent on a PDSCH before switching by the second node subject to scheduling of the first node, or may be sent on a PUSCH after switching by the first node subject to scheduling of the second node.

Step 305: The second node sends, to the first node, information required for the first node to access the second node. The information includes the first parameter set of the second node. The information may be sent on a PUSCH before switching by the second node subject to scheduling of the first node, or may be sent on a PDSCH after switching by the first node subject to scheduling of the second node. In addition, the first node may read information broadcast (on a PBCH or a PDSCH) by the second node.

A sequence of the foregoing steps is adjustable. For example, in one example implementation, step 304 and/or step 305 are/is performed before step 301. According to the method for switching the parent-child relationship that is provided in this embodiment of this application, an additional beam search or beam training may not be performed in a switching process.

By using the method, the parent-child relationship between relay nodes can be switched, to avoid or reduce communication interruptions.

Embodiment 2

Regarding a method for switching a parent-child relationship between relay nodes, this embodiment provides a specific implementation method for beam pair adjustment. Certainly, the method in this embodiment may alternatively be performed independently, and is unnecessarily dependent on another embodiment. In this embodiment, a beam is a communication resource. The beam may be a wide beam, a narrow beam, or a beam of another type. A technology for forming the beam may be a beamforming technology or another technology. The beamforming technology may be specifically a digital beamforming technology, an analog beamforming technology, or a digital-analog hybrid beamforming technology. Different beams may be considered as different resources. Different beams may be used to send same information or different information. In some embodiments, a plurality of beams having same or similar communication features may be considered as one beam. One beam may correspond to one or more antenna ports, and the antenna port is used to transmit a data channel, a control channel, a sounding signal, and the like. For example, a transmit beam may refer to distribution of signal strength formed in different directions in space after a signal is transmitted through an antenna; and a receive beam may refer to distribution of signal strength, in different directions in space, of a radio signal received through an antenna. It may be understood that, one or more antenna ports used for forming one beam may also be considered as one antenna port set. In a protocol, a beam may also be embodied as a spatial filter (spatial filter). In the protocol, a beam may further reflect a quasi co-location (QCL) relationship between antenna ports, and a spatial reception parameter (spatial Rx parameter). If a large-scale property of a channel of a symbol transmitted on one antenna port can be inferred from a channel of a symbol transmitted on another antenna port, the two antenna ports are referred to as being quasi co-located. In the protocol, a beam may be indicated by identifiers of various signals, for example, a resource identifier (ID) and/or an antenna port number of a CSI-RS, a resource ID and/or an antenna port number of a sounding reference signal (SRS), a TRS (tracking reference signal, tracking signal) number, and an index of a synchronization signal/physical broadcast channel block (SS/PBCH block), which is also briefly referred to as an SSB in this application. In this embodiment of this application, QCL mainly refers to spatial QCL, but may also be another type of QCL, for example, QCL about a delay and a frequency shift. If there is a QCL relationship between reference signals, between SSBs, or between a reference signal and an SSB (in other words, the reference signals are QCL-ed, the SSBs are QCL-ed, or the reference signal and the SSB are QCL-ed), it may be considered that the reference signals are on a same beam, the SSBs are on a same beam, the reference signal and the SSB are on a same beam, or a beam indicated by one reference signal may be obtained by using a beam indicated by another reference signal that has a QCL relationship with the reference signal. Therefore, beam pair adjustment may be performed by using a signal that indicates a beam. For example, beam pair adjustment may be performed by using a signal such as an SSB, an SRS, or a CSR-RS. This is described below in detail.

Figure 4:
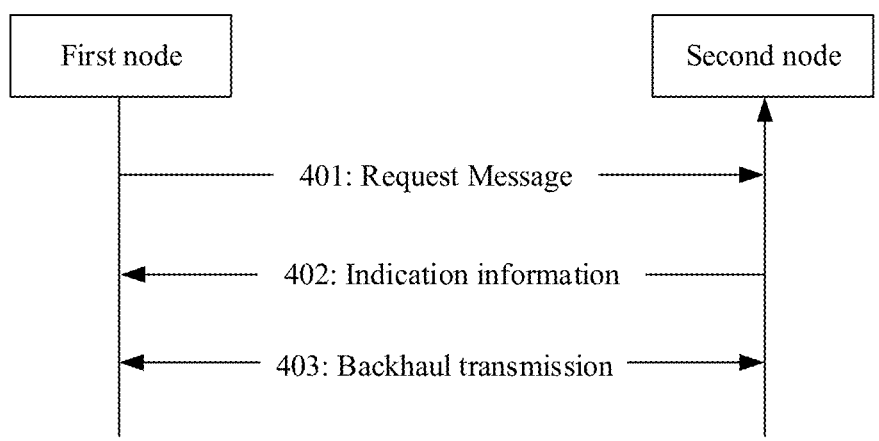
FIG. 4 is a schematic diagram of a relay transmission method according to one embodiment in accordance with the present disclosure.

FIG. 4 is a schematic diagram of a relay transmission method according to one embodiment in accordance with the present disclosure. As shown in FIG. 4, the method includes the following steps.

Step 401: A second node receives a request message from a first node, where the request message is used to request the second node to become a parent node of the first node. In this case, the first node is still a parent node of the second node.

Figure 5:
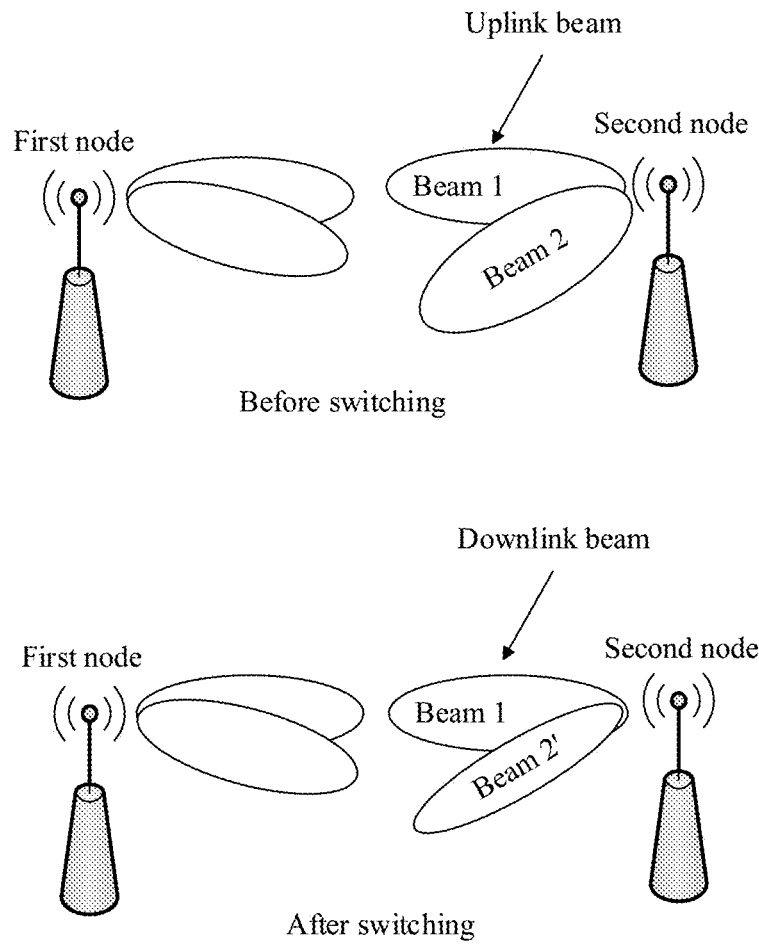
FIG. 5 is a schematic diagram of a beam used before switching and a beam used after switching according to one embodiment in accordance with the present disclosure.

Step 402: The second node sends indication information to the first node, where the indication information is used to indicate that a downlink beam sent from the second node to the first node after the second node becomes the parent node is the same as or similar to an uplink beam sent from the second node to the first node when the first node is the parent node. That the downlink beam is similar to the uplink beam indicates that the downlink beam may be obtained by using the uplink beam. FIG. 5 is a schematic diagram of a beam used before switching and a beam used after switching according to one embodiment in accordance with the present disclosure. As shown in FIG. 5, the second node sends indication information to the first node, where the indication information indicates that a beam 1 before switching in FIG. 5 is the beam 1 after switching in FIG. 5. Alternatively, the indication information may indicate that a beam 2 before switching in FIG. 5 is similar to a beam 2' after switching in FIG. 5. The downlink beam may be a downlink transmit beam of the second node, and the uplink beam may be an uplink transmit beam of the second node. Alternatively, the downlink beam may be a beam pair for downlink transmission from the second node to the first node. For example, the beam pair includes a downlink transmit beam of the second node and a corresponding downlink receive beam of the first node. The uplink beam may be a beam pair for uplink transmission from the second node to the first node. To be specific, the beam pair includes an uplink transmit beam of the second node and a corresponding uplink receive beam of the first node.

The downlink beam may be indicated by an identifier of a first reference signal, and the uplink beam may be indicated by an identifier of a second reference signal. That the downlink beam is the same as or similar to the uplink beam is represented by a quasi co-location (QCL) relationship between the first reference signal and the second reference signal. For example, the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node. A correspondence between a beam used before switching and a beam used after switching may be obtained based on the QCL relationship between the first reference signal and the second reference signal (where for example, a specific beam used before switching and a specific beam used after switching are the same or similar). In this way, an additional beam search or beam training may not be performed in a switching process.

Further, the indication information carries at least one of a system information block (SIB), a master information block (MIB), or available resource information of the second node. The indication information may carry some types of SIBs of the second node.

Before switching, when the first node is the parent node, a transmit beam of the first node is a transmit beam used for performing downlink transmission by the first node, and a receive beam of the first node is a receive beam used for performing uplink receiving by the first node. A transmit beam of the second node is a transmit beam used for performing uplink transmission by the second node, and a receive beam of the second node is a receive beam used for performing downlink receiving by the second node. After switching, to be specific, when the first node is the parent node, the second node uses the transmit beam used before switching, to perform downlink transmission. In this case, the transmit beam used before switching is a transmit beam used after switching. The first node may use the receive beam received before switching to perform receiving after switching. Because there is a correspondence between a transmit beam of the second node and a receive beam of the first node before switching, the first node can determine a corresponding receive beam to be used after switching, provided that the first node can obtain a correspondence between an uplink transmit beam used before switching and a downlink transmit beam used after switching that are of the second node. Therefore, a beam search or beam training is not required for determining (or selecting) a transmit beam of the second node and a receive beam of the first node. Similarly, a correspondence between a downlink receive beam used before switching and an uplink receive beam used after switching that are of the second node may also be notified to the first node, to help the first node determine an uplink transmit beam to be used after switching. In this application, only a correspondence, notified by the second node, between a transmit beam used before switching and a transmit beam used after switching is used as an example for description. Similarly, a case of a receive beam may be obtained. Details are not described herein again.

For example, the first reference signal is the SSB sent by the second node, and the second reference signal is the SRS sent by the second node or the SSB sent by the first node. For ease of description, an SRS sent by the first node is denoted as an SRS 1, the SRS sent by the second node is denoted as an SRS 2, the SSB sent by the first node is denoted as an SSB 1, and the SSB sent by the second node is denoted as an SSB 2.

Before switching, the first node is the parent node and the second node is a child node. When allocating a downlink transmission resource to the second node, the first node may indicate, through one or more SSBs 1, a beam used for transmitting a downlink signal, in other words, indicate that there is a QCL relationship between the transmitted downlink signal and the one or more SSBs 1. For example, the first node indicates that there is a QCL relationship between a DMRS for a PDSCH and an SSB 1_n. After obtaining QCL information, the second node may receive the PDSCH by using a beam used for receiving the SSB 1_n. When the first node schedules the second node to perform uplink transmission, a transmit beam may be indicated in two manners: (1) The SRS 2 is used to indicate the beam. To be specific, a QCL relationship between a transmit signal and one or more SRSs 2 is indicated in uplink scheduling information or signal configuration information. For example, a resource ID (which is denoted as an SRS 2_k) of the SRS 2 is indicated in PUSCH scheduling information. After obtaining the scheduling information, the second node sends a PUSCH by using a beam used for sending the SRS 2_k. (2) The SSB 1 is used to indicate the beam. To be specific, a QCL relationship between a transmit signal and one or more SSBs 1 is indicated in uplink scheduling information or signal configuration information. For example, a QCL relationship between an SRS 2 and the SSB 1 is indicated in an SRS 2 configuration process. After receiving configuration information, the second node sends the SRS 2 by using a beam used for receiving the SSB 1.

After switching, the first node is the child node and the second node is the parent node. It is similar to an indication manner used before switching that, during downlink transmission from the second node to the first node, one or more SSBs 2 may be used to indicate a beam for downlink transmission for the second node, and during uplink transmission from the first node to the second node, one or more SRSs 1 or SSBs 2 may be used to indicate a beam for uplink transmission for the first node.

For transmission from the second node to the first node, because a condition of a channel between the first node and the second node may very probably not change, a same beam set may be used for transmission between the two nodes before and after switching. However, uplink transmission is performed from the second node to the first node before switching, and the SRS 2 and the SSB 1 are used to indicate a beam. Downlink transmission is performed from the second node to the first node after switching, and the SSB 2 should be used to indicate a beam. Therefore, beam indication methods or reference signals used (before and after switching) for indicating beams are different in uplink and downlink transmission. To indicate a same beam set by using different reference signal sets, a correspondence between a first reference signal set and a second reference signal set may be determined. Similarly, solutions for a beam set and a reference signal set (for example, the first reference signal set or the second reference signal set) may be obtained with reference to the foregoing method. For example, extension is performed on the foregoing uplink beam/downlink beam to obtain a plurality of uplink beams/downlink beams, and extension is performed on the first reference signal/second reference signal to obtain a plurality of first reference signals/second reference signals. Therefore, details are not described herein again.

Based on the foregoing analyses, the correspondence between the first reference signal and the second reference signal may be obtained. The correspondence may be represented in table form. Table 1 shows the correspondence between the first reference signal and the second reference signal. As shown in Table 1, before switching, the second node sends one or more transmit beams, and the one or more transmit beams may be represented by one or more SRSs 2 and/or one or more SSBs 1. After switching, the second node sends one or more transmit beams, and the one or more transmit beams may be represented by one or more SSBs 2. There is a correspondence, usually a QCL relationship, between two reference signals in a same row. In other words, a beam is indicated by using the two reference signals in the same row, or a beam indicated by one reference signal may be obtained by using a beam indicated by another reference signal that has a QCL relationship with the reference signal.

It should be noted that in the following table, a number of a reference signal such as an SSB 1_1 is used only for ease of description and does not represent an actual numbering method.

TABLE 1

Correspondence between the first reference signal and the second reference signal

| Second reference signal (which is an indication resource for a transmit beam before switching or is used to indicate an uplink transmit beam sent from the second node to the first node before switching) | First reference signal (which is an indication resource for a transmit beam after switching or is used to indicate a downlink transmit beam sent from the second node to the first node after switching) | (Optional) Beam indicated by the reference signal |
|---|---|---|
| SRS 2_1 | SSB 2_1 | X_1 |
| SRS 2_2 | SSB 2_2 | X_2 |
| . . . | . . . | |
| SRS 2_m | SSB 2_m | X_m |
| SSB 1_1 | SSB 2_m + 1 | . . . |

TABLE 1-continued

Correspondence between the first reference signal and the second reference signal

| Second reference signal (which is an indication resource for a transmit beam before switching or is used to indicate an uplink transmit beam sent from the second node to the first node before switching) | First reference signal (which is an indication resource for a transmit beam after switching or is used to indicate a downlink transmit beam sent from the second node to the first node after switching) | (Optional) Beam indicated by the reference signal |
|---|---|---|
| SSB 1_2 | SSB 2_m + 2 | ... |
| ... | ... | ... |
| SSB 1_n | SSB 2_k | ... |

An SRS 2 of the second node is configured by the first node before switching. When the second node notifies the first node of the correspondence shown in Table 1, each SRS 2 may be indicated by an ID of the SRS 2. The first node may determine a specific SRS 2 through the ID. An SSB 1 or SSB 2 may be indicated by an index (index) of the SSB 1 or an index of the SSB 2 respectively. The first node and the second node may determine a specific SSB 1 or SSB 2 through the index of the SSB 1 or the index of the SSB 2 respectively. When the first node knows SSB information (including a start location, a periodicity, and the like) of the second node, after the second node notifies the first node of the correspondence shown in Table 1, the first node may receive a corresponding SSB 2 by using a beam used for receiving an SRS 2 or a beam used for sending an SSB 1.

In some embodiments, step 402 may also be expressed as: The first node receives indication information sent by the second node.

Step 403: The first node communicates with the second node based on the indication information. Specifically, the first node receives a configuration message from the second node, where the configuration message carries information about a downlink receiving resource of the first node/an uplink sending resource of the first node. The first node performs downlink receiving/uplink sending based on the indication message and the configuration message.

The second node sends downlink data to the first node during downlink transmission, and there is a QCL relationship between a demodulation reference signal (DMRS) for the downlink data and the first reference signal. In this way, the first node may determine a receive beam based on the correspondence, and receive the downlink data through the determined receive beam. Specifically, the second node sends a PDSCH (or PDCCH) to the first node, and there is a QCL relationship between a DMRS for the PDSCH (or PDCCH) and the first reference signal. The QCL relationship may be configured and indicated in various messages such as an RRC information element (IE), a MAC control element (CE), and DCI. Optionally, the second node notifies, on a PDCCH corresponding to the PDSCH, the first node of the QCL relationship between the DMRS for the PDSCH (or PDCCH) and the first reference signal.

When the second node is the parent node, the second node may configure information about a CSI-RS 2 for the first node during downlink transmission. (1) Configuration information of the CSI-RS 2 may indicate that there is a QCL relationship between the CSI-RS 2 and one or more SSBs 2. Alternatively, (2) configuration information of the CSI-RS 2 may indicate that there is a QCL relationship between the CSI-RS 2 and one or more SSBs 1. In implementation, for case (1), the first node may receive the CSI-RS 2 by using a beam used for receiving the SSB 2; and for case (2), the first node may receive the CSI-RS 2 by using a beam used for sending the SSB 1. It is different from a common CSI-RS configuration that, in the foregoing configuration, an SSB having a QCL relationship with a CSI-RS may be sent by the second node, or may be sent by the first node.

When the second node is the parent node, the second node may configure information about an SRS 2 for the first node during uplink transmission. (1) Configuration information of the SRS 2 may indicate that there is a QCL relationship between the SRS 2 and one or more SSBs 2. Alternatively, (2) configuration information of the SRS 2 may indicate that there is a QCL relationship between the configured SRS 2 and one or more SSBs 1. In implementation, for case (1), the first node may send the SRS 2 by using a beam used for receiving the SSB 2; and for case (2), the first node may send the SRS 2 by using a beam used for sending the SSB 1. It is different from a common SRS configuration that, in the foregoing configuration, an SSB having a QCL relationship with an SRS may be sent by the second node, or may be sent by the first node.

Embodiment 3

Figure 6A:
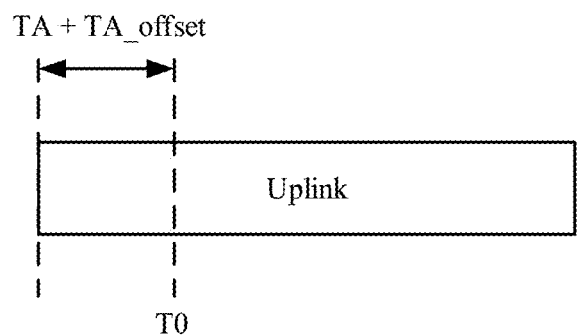
FIG. 6a is a schematic diagram of an uplink timing.

Regarding a method for switching a parent-child relationship between relay nodes, this embodiment provides a specific implementation method for time synchronization adjustment. Certainly, the method in this embodiment may alternatively be performed independently, and is unnecessarily dependent on another embodiment. FIG. 6a is a schematic diagram of an uplink timing. As shown in FIG. 6a, in a timing process, after a terminal (or a relay node, where the terminal is merely used as an example for description) completes synchronization, a start moment of a frame for downlink receiving is used as a reference timing point (which is denoted as T0). When sending a random access signal, the terminal sends the random access signal a fixed timing advance TA_offset ahead of T0. The TA_offset is defined in a protocol, and a specific value of the TA_offset may be related to factors such as a subcarrier spacing, a frequency band, and a duplex mode. After receiving the random access signal, a base station allocates a timing advance TA to the terminal based on a measured delay, so that uplink transmit signals of all terminals arrive at the base station basically at a same time. After receiving the TA allocated by the base station, the terminal sends an uplink signal TA+TA_offset ahead of the timing reference point T0. The TA and the TA_offset are known to the base station, and the base station may change a TA value through MAC signaling. In this case, a time difference in FIG. 6a is represented by TA+TA_offset.

With reference to the foregoing timing process, this embodiment provides a time synchronization method. Time synchronization may be implemented using two solutions: a RACH-procedure-based solution and a signaling exchange solution.

In this embodiment, it is assumed that the first node and the second node both send downlink signals (such as SSBs) before and after switching. Therefore, the two nodes have respective downlink sending timings. If the second node does not send a downlink signal before switching, a timing for performing downlink sending by the second node in this embodiment may be a timing for performing downlink sending after switching. If the first node stops sending a downlink signal after switching, a timing for performing downlink sending by the first node in this embodiment may be a timing for performing downlink sending before switching.

RACH-Procedure-Based Solution:

Before switching, the second node notifies or reports an SSB configuration and a random access resource configuration to the first node. The first node receives the SSB configuration and the random access resource configuration that are notified or reported by the second node. The first node detects, based on the received SSB configuration, a synchronization signal/PBCH block (SSB) delivered by the second node, and performs downlink time synchronization based on the detected synchronization signal/PBCH block. The first node sends a random preamble based on the received random access resource configuration. The second node detects the random access preamble sent by the first node, performs uplink time synchronization based on the detected random access preamble, and allocates a TA value for the first node. Subsequently, the second node may continue to configure a reference signal for the first node, so that the first node performs precise downlink synchronization. In this case, the second node may continue to adjust the TA value for the first node.

Signaling Exchange Solution:

The first node and the second node may implement time synchronization adjustment through signaling exchange. Specifically, the second node notifies the first node of new uplink and downlink timing information. For example, the second node notifies the first node of a time difference between a timing for performing downlink sending by the second node and a timing for performing uplink sending from the second node to the first node before switching. Then, the first node may obtain a required timing for downlink receiving based on the time difference and a timing for performing uplink receiving by the first node. For another example, the second node notifies the first node of a time difference between a timing for performing uplink sending from the first node to the second node after switching and a timing for performing downlink sending by the first node. Based on the time difference, the first node may set a timing for uplink sending.

FIG. 7 is a schematic diagram of a time synchronization method according to one embodiment in accordance with the present disclosure. As shown in FIG. 7, the method is applicable to a downlink sending timing and includes the following steps.

Step 701: A second node notifies a first node of a first time difference, where the first time difference is a time difference between a start moment of a frame in which the second node performs downlink sending and a start moment of a frame in which the second node performs uplink sending when the first node is the parent node.

Step 702: The first node determines, based on the first time difference, a timing for downlink receiving.

The second node knows a time difference between a timing for performing downlink sending and a timing for performing uplink sending by the second node. However, before switching, the first node receives only uplink data sent by the second node, and therefore does not know a timing for performing downlink sending by the second node. After receiving the first time difference sent by the second node, the first node may deduce a timing at which the first node receives downlink data sent by the second node, based on the first time difference and a timing at which the first node receives the uplink data sent by the second node. FIG. 6b is a schematic diagram of a time difference between a downlink frame and an uplink frame. In this case, both the uplink frame and the downlink frame in FIG. 6b are frames in which the second node performs sending. For example, in FIG. 6b, T0 may be considered as the start moment of the frame in which the second node performs downlink sending, and the time difference may be considered as the first time difference.

In an example, the first time difference may be carried in the foregoing response message.

Figure 8:
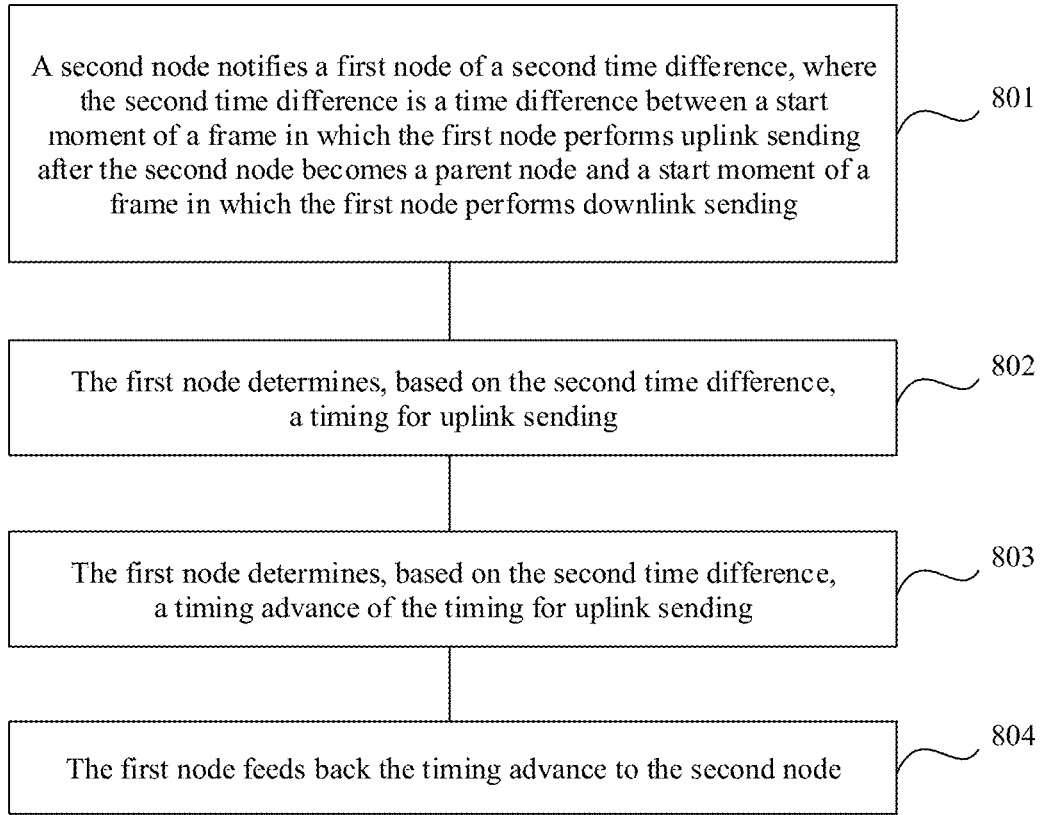
FIG. 8 is a schematic diagram of a time synchronization method according to one embodiment in accordance with the present disclosure.

FIG. 8 is a schematic diagram of a time synchronization method according to one embodiment in accordance with the present disclosure. As shown in FIG. 8, the method is applicable to an uplink sending timing and includes the following steps.

Step 801: A second node notifies a first node of a second time difference, where the second time difference is a time difference between a start moment of a frame in which the first node performs uplink sending after the second node becomes a parent node and a start moment of a frame in which the first node performs downlink sending.

Step 802: The first node determines, based on the second time difference, a timing for uplink sending.

Step 803: The first node determines, based on the second time difference, a timing advance of the timing for uplink sending.

Step 804: The first node feeds back the timing advance to the second node.

Steps 803 and 804 are optional.

In one example, the second time difference may be carried in the foregoing response message. In this case, both the uplink frame and the downlink frame in FIG. 6b are frames in which the first node performs sending. For example, in FIG. 6b, T0 may be considered as the start moment of the frame in which the first node performs downlink sending, and the time difference may be considered as the second time difference.

In this embodiment, a timing relationship between relay nodes needs to be adjusted accordingly due to switching of a parent-child relationship between the relay nodes.

After switching, the timing for performing uplink sending by the first node needs to be determined by the second node. The second node knows a timing for performing downlink sending by the first node. Therefore, the second node may notify the first node of the second time difference, so that the first node determines the timing for performing uplink sending by the first node after switching.

For example, the second time difference is denoted as T_delta. The second node needs to notify the first node of T_delta, so that the first node can use T_delta after switching. T_delta is an initial offset. In subsequent timing management, the second node may need to maintain a regular TA. In this case, the first node may convert a timing value obtained based on T_delta into a TA value, and send the TA value to the second node. For example, the start moment of the frame in which the first node performs downlink sending is denoted as T0, and the start moment of the frame in which the first node performs uplink sending is denoted as T0'. Then, a possible calculation formula for a TA may be obtained: TA=T0'−T0+T_delta. Herein, T_delta is an advance relative to T0.

According to the time synchronization method provided in this embodiment, time synchronization between the first node and the second node can be implemented rapidly.

It should be noted that the foregoing two solutions may be used in combination. For example, RACH-procedure-based time synchronization adjustment may be performed after time synchronization adjustment is performed through signaling exchange. Alternatively, the signaling exchange solution is used for downlink time synchronization adjustment, and the RACH-procedure-based solution is used for uplink time synchronization adjustment.

Corresponding to the foregoing embodiments for the methods, a first node and a second node may be divided into function modules in one embodiment in accordance with the present disclosure. For example, each function module may be obtained through division based on a corresponding function, or two or more functions may be integrated into one processing module. The integrated module may be implemented in a form of hardware, or may be implemented in a form of a software function module. It should be noted that module divisions described herein are merely examples, and are merely a logical function division. In actual implementation, another division manner may be used.

Figure 9:
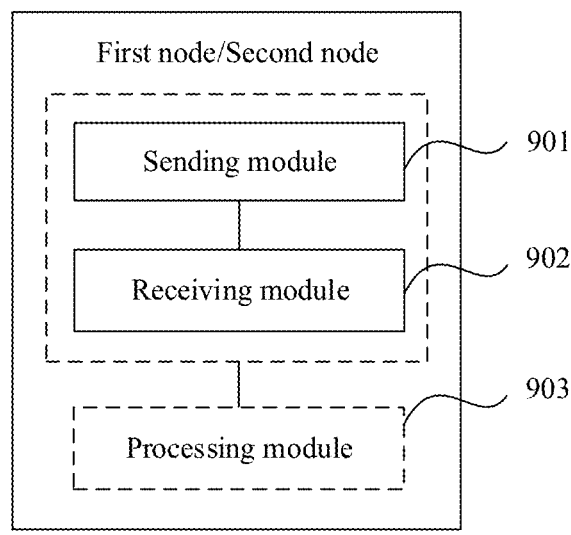
FIG. 9 is a schematic diagram of a possible structure of a first node or a second node according to one embodiment in accordance with the present disclosure.

When each function module corresponding to each function is obtained through division, FIG. 9 is a schematic diagram of a structure of a first node or a second node according to one embodiment in accordance with the present disclosure. The first node or the second node includes a sending module 901 and a receiving module 902. The sending module 901 is configured to support a related step of sending data or information by the first node or the second node in the method embodiments. For example, the second node sends indication information, or the first node sends a request message to the second node. The receiving module 902 is configured to support a related step of receiving data or information by the first node or the second node. For example, the second node receives the request message or the first node receives the indication information. In some embodiments, the first node or the second node further includes a processing module 903, where the processing module 903 is configured to support a related step of processing received information, to-be-sent information, or the like by the first node or the second node.

In hardware implementation, the processing module 903 may be a processor, a processing circuit, or the like. The sending module 901 may be a transmitter, a transmitter circuit, or the like. The receiving module 902 may be a receiver, a receiver circuit, or the like. The sending module 901 and the receiving module 902 may constitute a communications interface.

Figure 10:
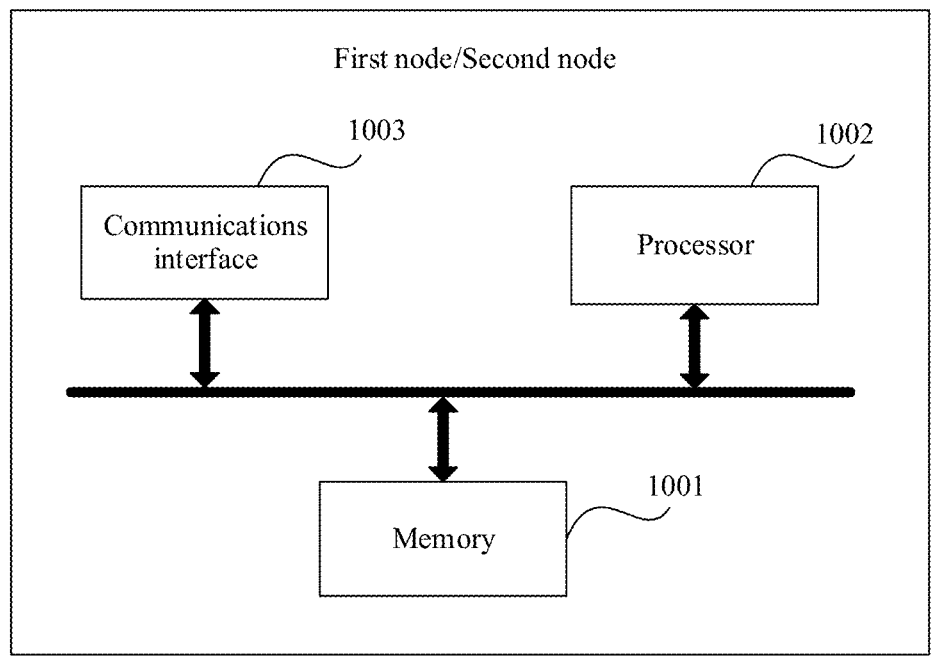
FIG. 10 is a schematic diagram of a possible logical structure of a first node or a second node according to one embodiment in accordance with the present disclosure.

FIG. 10 is a schematic diagram of a logical structure of a first node or a second node according to one embodiment in accordance with the present disclosure. As shown in FIG. 10, a first node or a second node includes a communications interface 1003. In this embodiment of this application, the communications interface 1003 is configured to support the first node or the second node in communicating with another device other than the first node or the second node. For example, the communications interface 1003 is configured to support the second node in sending indication information or the first node in sending a request message to the second node, or support the second node in receiving a request message or the first node in receiving indication information. Optionally, the first node or the second node may further include a memory 1001 and a processor 1002. The processor 1002 and the memory 1001 may be connected in a wired manner. Optionally, the processor 1002 may be configured to support the first node or the second node in processing received information, to-be-sent information, or the like. The memory 1001 is configured to store code and data of the first node or the second node.

In one implementation, the processing 1002 may be a central processing unit, a general-purpose processor, a digital signal processor, an application-specific integrated circuit, a field programmable gate array or another programmable logical device, a transistor logical device, a hardware component, or any combination thereof. The processor 1002 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor.

The foregoing mainly describes the solutions provided in the various embodiments from the perspective of interaction between network elements. It can be understood that, to implement the foregoing functions, the network elements, for example, the first node and the second node, include corresponding hardware structures and/or software modules for performing the functions. A person of ordinary skill in the art should easily be aware that, in combination with the examples described in the embodiments disclosed in this specification, network elements and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Another embodiment further provides a readable storage medium. The readable storage medium stores a computer-executable instruction, and a device (which may be a single-chip microcomputer, a chip, or the like) or a processor may invoke the computer-executable instruction stored in the readable storage medium to perform a step of the first node or the second node in the method provided in FIG. 3, FIG. 4, FIG. 7, or FIG. 8. The readable storage medium may include any medium that can store program code, such as a USB flash drive, a removable hard disk, a read-only memory, a random access memory, a magnetic disk, or an optical disc.

Another embodiment further provides a computer program product. The computer program product includes a computer-executable instruction, and the computer-executable instruction is stored in a computer-readable storage medium. At least one processor of a device may read the computer-executable instruction from the computer-readable storage medium, and when the at least one processor executes the computer-executable instruction, the device performs a step of the first node, the second node, or a third node in the method provided in FIG. 3, FIG. 4, FIG. 7, or FIG. 8.

Another embodiment further provides a communications system. The communications system includes a plurality of devices, and the plurality of devices include a first node and a second node. Optionally, the system may further include a third node. The first node or the second node may be the device provided in FIG. 9 or FIG. 10.

One embodiment in accordance with the present disclosure further provides a chip for implementing the method described in the foregoing embodiment (for example, as shown in FIG. 3, FIG. 4, FIG. 7, or FIG. 8). The chip includes a processing circuit and a transceiver circuit. The transceiver circuit may be, for example, an input/output interface, a pin, or a circuit. The processing circuit may execute a computer-executable instruction stored in a storage unit. The chip may further include the storage unit. The storage unit may be a register, a cache, or the like. Certainly, an additional storage unit may also be provided for the chip. For example, the storage unit may alternatively be a storage unit that is in a terminal or an access device and that is located outside the chip, such as a read-only memory (ROM) or another type of static storage device that can store static information and an instruction, or a random access memory (RAM). The chip may be applied to a base station, a relay node, or a terminal.

Still another embodiment of this application provides a device. The device includes a processor, and the processor runs code in a memory, to enable the device to perform the foregoing methods. The memory stores data and the code. The memory is located in the device, and the memory is coupled to the processor. The memory may alternatively be located outside the device.

It should be noted that reference may be made to the foregoing method embodiments to obtain features related to the apparatus embodiments, for example, processing capability information and indication information. These features are not described one by one in the apparatus part, but a person skilled in the art can easily obtain a corresponding apparatus based on the descriptions of the method embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

All or some of the foregoing embodiments may be implemented through software, hardware, firmware, or any combination thereof. When software is used to implement the embodiments, all of some of the embodiments may be implemented in a form of a computer program product. The computer program product includes one or more computer instructions. When the computer instructions are loaded and executed on the computer, the procedures or functions according to the various embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid-State Disk (SSD)), or the like.

In summary, the foregoing descriptions are merely examples of various embodiments, but is not intended to limit the protection scope of this application. Any modification, equivalent replacement, or improvement made without departing from the spirit and principle of this application shall fall within the protection scope of this application.

What is claimed is:

1. A relay transmission method, wherein a first node is a parent node of a second node, and the method comprises:
    receiving, by the second node, a request message from the first node, wherein the request message is configured to request the second node to become a parent node of the first node; and
    sending, by the second node, indication information to the first node, wherein the indication information indicates that a downlink beam sent from the second node to the first node after the second node becomes the parent node is the same as or similar to an uplink beam sent from the second node to the first node when the first node is the parent node.

2. The method according to claim 1, wherein the indication information comprises an identifier of a first reference signal and an identifier of a second reference signal;
    the downlink beam is indicated by the identifier of the first reference signal, and the uplink beam is indicated by the identifier of the second reference signal; and
    that the downlink beam is the same as or similar to the uplink beam is represented by a quasi co-location (QCL) relationship between the first reference signal and the second reference signal.

3. The method according to claim 2, wherein
    the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node.

4. The method according to claim 1, wherein
    the indication information further carries at least one of a system information block (SIB), a master information block (MIB), or available resource information of the second node.

5. The method according to claim 1, wherein the method further comprises:
    notifying, by the second node, the first node of a first time difference, wherein the first time difference is a time difference between a start moment of a frame in which the second node performs downlink sending and a start moment of a frame in which the second node performs uplink sending when the first node is the parent node.

6. The method according to claim 1, wherein the method further comprises:
    notifying, by the second node, the first node of a second time difference, wherein the second time difference is a time difference between a start moment of a frame in which the first node performs uplink sending after the second node becomes the parent node and a start moment of a frame in which the first node performs downlink sending.

7. A relay transmission apparatus, wherein a first node is a parent node of a second node, and the apparatus comprises:
a receiver, configured to receive a request message from the first node, wherein the request message is configured to request the second node to become a parent node of the first node; and
a transmitter, configured to send indication information to the first node, wherein the indication information indicates that a downlink beam sent from the second node to the first node after the second node becomes the parent node is the same as or similar to an uplink beam sent from the second node to the first node when the first node is the parent node.

8. The apparatus according to claim 7, wherein the indication information comprises an identifier of a first reference signal and an identifier of a second reference signal;
the downlink beam is indicated by the identifier of the first reference signal, and the uplink beam is indicated by the identifier of the second reference signal; and
the downlink beam is the same as or similar to the uplink beam is represented by a quasi co-location (QCL) relationship between the first reference signal and the second reference signal.

9. The apparatus according to claim 8, wherein
the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node.

10. The apparatus according to claim 7, wherein
the indication information further carries at least one of a system information block (SIB), a master information block (MIB), or available resource information of the second node.

11. The apparatus according to claim 7, wherein the transmitter is further configured to notify the first node of a first time difference, wherein the first time difference is a time difference between a start moment of a frame in which the second node performs downlink sending and a start moment of a frame in which the second node performs uplink sending when the first node is the parent node.

12. The apparatus according to claim 7, wherein the transmitter is further configured to notify the first node of a second time difference, wherein the second time difference is a time difference between a start moment of a frame in which the first node performs uplink sending after the second node becomes the parent node and a start moment of a frame in which the first node performs downlink sending.

13. A non-transitory computer readable medium storing computer instructions, when executed by one or more processors, cause the one or more processors to perform:

receiving, by a second node, a request message from a first node, wherein the request message is configured to request the second node to become a parent node of the first node; and
sending, by the second node, indication information to the first node, wherein the indication information indicates that a downlink beam sent from the second node to the first node after the second node becomes the parent node is the same as or similar to an uplink beam sent from the second node to the first node when the first node is the parent node; and, wherein the first node is a parent node of the second node.

14. The non-transitory computer readable medium according to claim 13, wherein the indication information comprises an identifier of a first reference signal and an identifier of a second reference signal;
the downlink beam is indicated by the identifier of the first reference signal, and the uplink beam is indicated by the identifier of the second reference signal; and
that the downlink beam is the same as or similar to the uplink beam is represented by a quasi co-location (QCL) relationship between the first reference signal and the second reference signal.

15. The non-transitory computer readable medium according to claim 14, wherein
the first reference signal is a synchronization signal/PBCH block (SSB) sent by the second node or a channel state information-reference signal (CSI-RS) sent by the second node, and the second reference signal is a sounding reference signal (SRS) sent by the second node or a synchronization signal/PBCH block (SSB) sent by the first node.

16. The non-transitory computer readable medium according to claim 13, wherein
the indication information further carries at least one of a system information block (SIB), a master information block (MIB), or available resource information of the second node.

17. The non-transitory computer readable medium according to claim 13, wherein the one or more processors are further caused to perform:
notifying, by the second node, the first node of a first time difference, wherein the first time difference is a time difference between a start moment of a frame in which the second node performs downlink sending and a start moment of a frame in which the second node performs uplink sending when the first node is the parent node.

18. The non-transitory computer readable medium according to claim 13, wherein the one or more processors are caused to perform:
notifying, by the second node, the first node of a second time difference, wherein the second time difference is a time difference between a start moment of a frame in which the first node performs uplink sending after the second node becomes the parent node and a start moment of a frame in which the first node performs downlink sending.

* * * * *